United States Patent [19]

Cassidenti

[11] Patent Number: 4,535,216

[45] Date of Patent: Aug. 13, 1985

[54] METAL-WORKING TOOL USING ELECTRICAL HEATING

[75] Inventor: Michael L. Cassidenti, Canoga Park, Calif.

[73] Assignee: Rockwell International Corporation, El Sequndo, Calif.

[21] Appl. No.: 542,282

[22] Filed: Oct. 14, 1983

[51] Int. Cl.³ .......................... B23B 27/10; B23P 1/02
[52] U.S. Cl. ...................................... 219/68; 82/1 C; 82/51; 82/DIG. 1; 407/11
[58] Field of Search ...................... 407/1, 11, 113, 114, 407/2, 6, 48, 103; 82/1 C, 51, DIG. 1, 1 R; 29/DIG. 13, DIG. 24; 219/68

[56] References Cited

U.S. PATENT DOCUMENTS

| | | | |
|---|---|---|---|
| 2,365,965 | 12/1944 | Littmann | 407/118 |
| 3,109,915 | 11/1963 | Wennberg et al. | 82/DIG. 1 |
| 3,176,330 | 4/1965 | Jennings | 407/11 |
| 3,889,520 | 6/1975 | Stoferle et al. | 407/11 |
| 4,203,690 | 5/1980 | Tanaka et al. | 407/119 |
| 4,334,808 | 6/1982 | Seidel | 407/114 |

FOREIGN PATENT DOCUMENTS 3004166  8/1980  Fed. Rep. of Germany ........ 407/11

Primary Examiner—Leonidas Vlachos
Assistant Examiner—Jerry Kearns
Attorney, Agent, or Firm—H. Fredrick Hamann; Harry B. Field

[57] ABSTRACT

A hot metal-working tool 10 using electrical resistance heating. Metal-working tool 10 comprises seat 12, cutting insert 14 and chipbreaker 16. Electrical current source 35 provides current which flows between metal working edge 30 of insert 14 and the shear zone 80 of a workpiece 72 during the machine operation. Cutting insert 14 comprises two structural components, one of which 26, contacts chip 82 thereby providing a second path for current flow between tool 10 and shear zone 80. Shear zone 80 may thus be heated by current not passing through metal-working edge 30. The invention also provides for the flow of coolant fluid through internal passages in tool 10. The coolant fluid removes heat from metal working region 28 and is then discharged to bathe the region proximate metal working edge 30.

8 Claims, 8 Drawing Figures

METAL-WORKING TOOL USING ELECTRICAL HEATING

BACKGROUND OF THE INVENTION

1. Field of the Invention

This invention relates generally to the use of electricity for hot machining. More particularly, the invention relates to improved metal-working tools which use electrical current to heat the shear zones of metallic work pieces.

2. Description of the Prior Art

It is well known to those in the metal working art that metals and metal alloys tend to deform or shear more easily when heated. Since such deformation occurs in both the workpiece and the cutting tool, most metal-cutting operations take place at room temperature to prevent premature deterioration of metal-working tools. The difficulties encountered in machining high-strength materials such as titanium and inconel, however, have kindled renewed interest in hot machining processes.

A number of experimenters have investigated hot machining techniques involving the passage of electrical current through a workpiece for heating purposes while attempting to avoid rapid tool deterioration caused by such heating. U.S. Pat. No. 416,873 issued to B. C. Tilghman in 1889, a method is described whereby electricity is passed from a rotating cutting disk to a workpiece in order to soften the portion of the workpiece operated on by the cutting disk (the shear zone). In Tilghman's invention the cutting edge is connected to one electrode of a current source and the metal workpiece to the other, thereby causing current to pass between the cutting edge and the workpiece. The Tilghman method utilizes a rotating disk as the cutting tool in order to continuously change the point on the cutting edge through which current passes. This helps to minimize heating of the tool. However, when the metal-working tool is of other geometry such as a lathe insert or a milling tool or the like, a serious problem is created because electrical current passing through the tool cutting edge causes excessive heating and thus more rapid deterioration of the cutting edge. In 1962, Wennberg, Mehl and Krobacher published "Hot Machining of High Temperature Alloys Can Increase Production" in Volume 70 of *SAE Transactions*. The authors described various means for heating workpieces, such as resistance heating by passing electrical current either through the workpiece or through resistance heaters imbedded in the workpiece and Radio-Frequency (RF) resistance heating wherein RF energy was passed from a conventional chipbreaker to the chip being removed from a workpiece. With regard to the RF heating process, the authors stated, at page 152:

> "Since the high current in the immediate vicinity of the tool heats the (cutting) insert and tool holder by induction, nonmagnetic materials must be used for the tool holder and the cutting tool . . . . Since all carbide tools are magnetic, an oxide tool was used in these tests. However, since the oxide tool is a good insulator, if the chip loses contact with the chipbreaker, the current arcs causing immediate shattering of the tool . . . ."

The authors apparently did not consider through-the-tool D.C. current heating.

Other experimenters have reported experiments using electrical through-the-tool techniques. In Barrow, "Machining of High Strength Materials at Elevated Temperatures Using Electrical Current Heating", *Annals of the C.I.R.P, XIV,* Pages 145-151 (printed in Great Britain, 1966), the author describes electrical through-the-tool resistance heating techniques with a view to studying the effect of temperature on tool wear. Experimentally, a large alternating current (up to 500 A) was passed through the tool metal working edge to the workpiece. A disadvantage cited was that since the heat is generated at the tool (metal-working edge)/chip interface, the life of the tool is less than with previously used workpiece heating techniques.

In a later published article, Barrow, "Use of Electric Current for Hot Machining of High Strength Steels", *Machinery and Production Engineering*, Mar. 5, 1969, pp 370 et seq., the author described the use of both AC and DC electrical current of up to 1000 A in through-the-tool electrical heating techniques wherein the current was, once again, passed through the tool cutting edge to the workpiece. The essence of Barrow's results is that manipulation of current intensity, tool forces and cutting speeds can produce an improved tool life but that such improved life is limited by the heat generated by passing current directly through the tool metal-working edge (p. 371).

Thus, it is well established that through-the-tool passage of electrical current for hot machining may result in increased machinability of the workpiece. This technique enables the workpiece to be machined using less applied force than would be otherwise necessary, thereby increasing tool life. It also greatly reduces the vibration experienced by the cutting tool relative to that of the workpiece. Such hot machining allows high-strength metals to be worked more easily. The major disadvantage of this technique is that the improvement in tool life is limited by the heating and thus softening of the tool metal-working edge caused by electrical current passing therethrough.

OBJECTS OF THE INVENTION

It is thus an object of this invention to provide a metal-working tool for hot-machining operations which exhibits better wear characteristics than prior art hot metal-working tools.

Another object of this invention is to provide a bimetallic metal-working tool useful in electrical hot machining applications.

Another object of this invention is to provide a bimetallic hot metal-working tool which passes electrical current to the shear zone of a workpiece by a path other than the metal-working edge of the tool.

A further object of this invention is to provide a metal-working tool capable of cutting very high strength materials such as titanium and superalloys.

Other objects, advantages and novel features of the present invention will become apparent from the following detailed description of the invention.

BRIEF SUMMARY OF THE INVENTION

The present invention is directed to novel metal-working tools which provide a second path for electrical current flow therethrough to the shear zone of a workpiece, the second path avoiding the cutting edge of the tool. In accordance with a preferred embodiment, a bimetallic metal-working tool comprises a frame having a metal-working edge and a core inside the frame and in electrical contact therewith. The core has greater electrical conductivity than the frame. The core also has an upper extension which projects above the upper surface of the frame. A source of electrical current provides a first electrode in electrical contact with the metal-working tool and a second electrode in electrical contact with a workpiece to be machined. In operation, electrical current initially passes between the metal-working edge of the frame and the workpiece, completing an electrical circuit. As soon as machining begins, however, the chip being removed from the workpiece contacts the upper extension of the core to provide a second current flow path therethrough to the workpiece shear zone. A large amount of current flow is diverted from the metal-working edge/chip interface via such second current-flow path to the shear zone. Thus, reduced current flows through the metal-working edge to the shear zone and metal-working edge heating is reduced.

As described in copendings U.S. patent application Ser. No. 405,012, filed Aug. 9, 1982, the tool may be provided with a series of internal passages for directing coolant fluid proximate the metal-working region of the tool. The fluid is then directed through exit ports proximate the metal-working region of the tool.

Heat reduces the shear strength of the workpiece material and allows it to be cut at lower force and/or evaluation. However, heat also reduces cutting-tool strength. The present invention maintains the heat in the shear zone of the workpiece, but reduces it at the cutting edge of the tool, thereby providing the following advantages:

1. higher metal removal rates;
2. less power consumption;
3. improved tool life;
4. better surface finishes;
5. improved size control; and
6. ability to machine harder materials.

Benefits derived from these advantages may be one or more of the following:

1. lower metal removal costs;
2. reduced cutting tool costs;
3. less expensive holding fixtures;
4. elimination of secondary grinding operations;
5. less material distortion;
6. cheaper machines for the same job;
7. faster manufacturing-cycle times; and
8. reduced maintenance costs.

BRIEF DESCRIPTION OF THE DRAWINGS

The same elements or parts throughout the figures of the drawings are designated by the same reference characters, while equivalent elements bear a prime designation.

DESCRIPTION OF THE PREFERRED EMBODIMENT

Figure 1:
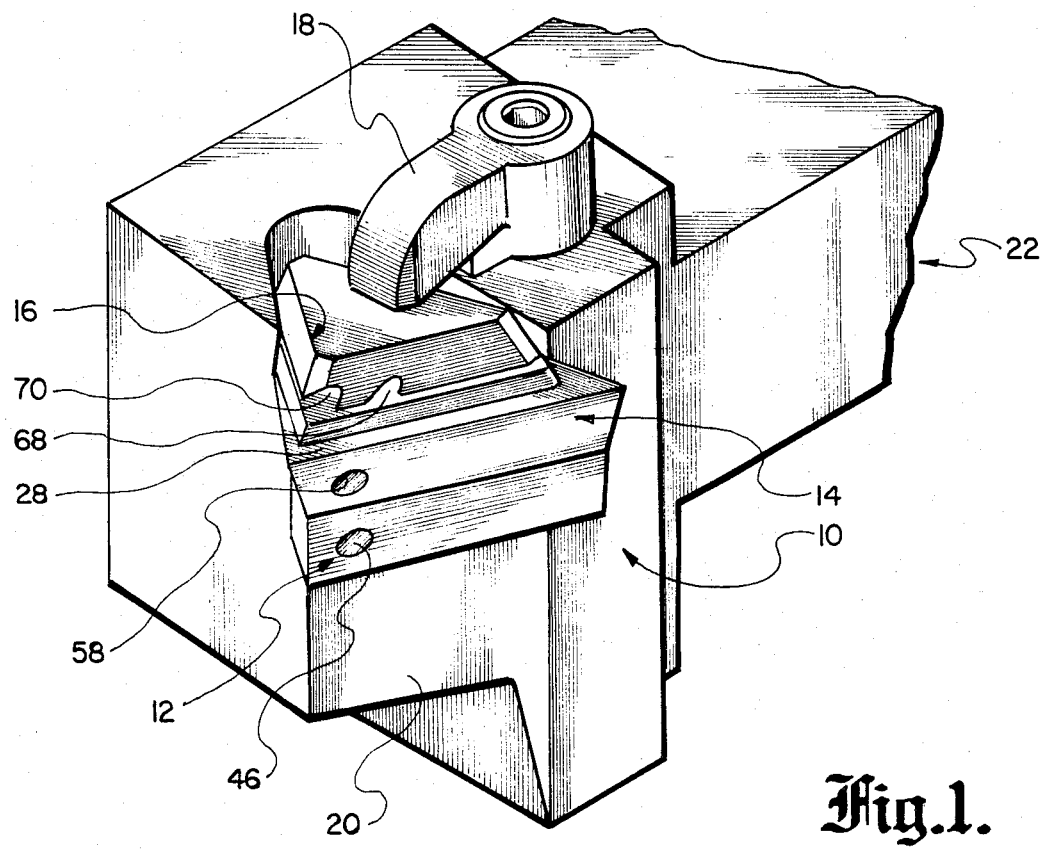
FIG. 1 is a perspective view of a metal-working tool in accordance with the invention.

FIG. 1 depicts a metal-working tool useful in lathes and the like, generally designated 10. Tool 10 is similar to a bimetallic metal-working tool described in Applicant's copending Patent Application, Ser. No. 405,012 filed Aug. 4, 1982, and is compatible with the present invention. Tool 10 may comprise three basic components, seat 12, cutting insert 14, and chipbreaker 16. As depicted, the three components are held together by upper and lower jaws 18 and 20, respectively, of clamping means 22.

Figure 2:
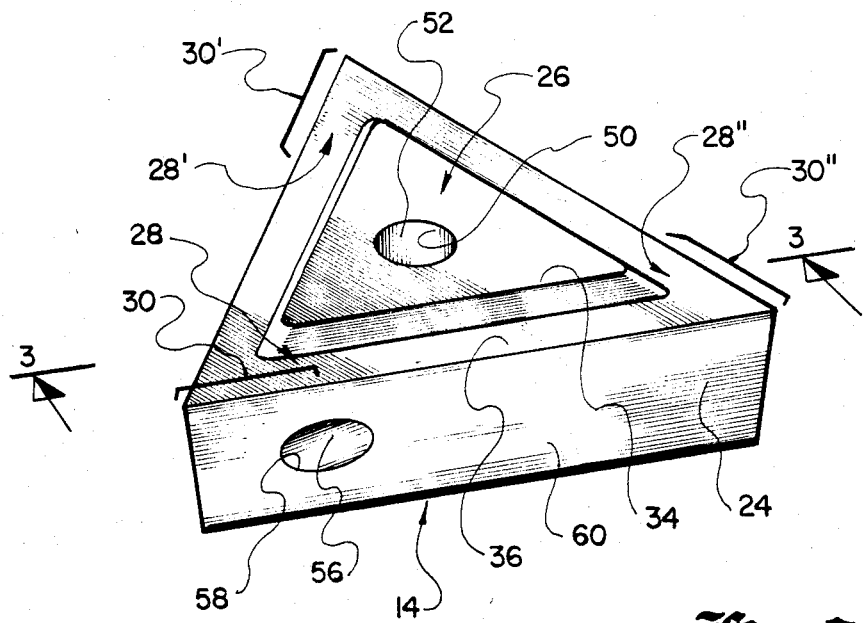
FIG. 2 is a perspective view of a cutting insert having a raised inner structural component and internal fluid coolant passages.

Cutting insert 14, depicted in FIG. 2, is a triangular, substantially planar structure comprising a first outer structural component, or frame, 24 encompassing a second inner structural component, or core, 26. In the preferred embodiment, outer frame 24 is made from an electrical conductor having good metal-working qualities such as carbide or tungsten provide. Geometrically outer frame 24 has first, second and third substantially identical metal-working regions 28,28' and 28'' each including respective metal-workiing edges 30,30' and 30''. Only one metal-working edge is used at any given time. Outer frame 24 also has a central cavity 32, depicted in FIG. 3, for receiving inner core 26 therein. Inner core 26 is made from a good conductor of electricity, such as silver or copper, and is bonded and electrically connected to outer frame 24, e.g., by electrodeposition. The materials which provide outer frame 24 with good metal-working qualities are typically not good conductors of electrical current compared to silver or copper. Inner core 26 has an extension 34 (in this case an upper extension) which projects outwardly from the substantially planar upper surface 36 of outer frame 24. As will be shown hereinbelow, the aforedescribed structure allows electrical current to pass from a current source 35 through inner core 26 to the shear zone of a workpiece without such current having to pass through the metal-working edge 30 of cutting insert 14.

The invention may utilize an internal fluid cooling system within metal-working tool 10. Such an internal cooling system is described in detail in Applicant's copending patent application, Ser. No. 405,012, filed Aug. 4, 1982. In the present embodiment, the simultaneous use of fluid passed through internal fluid passages for cooling the metal-working tool and electricity for heating the workpiece shear zone provides an excellent metal-working environment. Although cutting insert 14 could be used alone, it is moe commonly used in conjunction with a seat and/or a chipbreaker as described hereinbelow.

Figure 4:
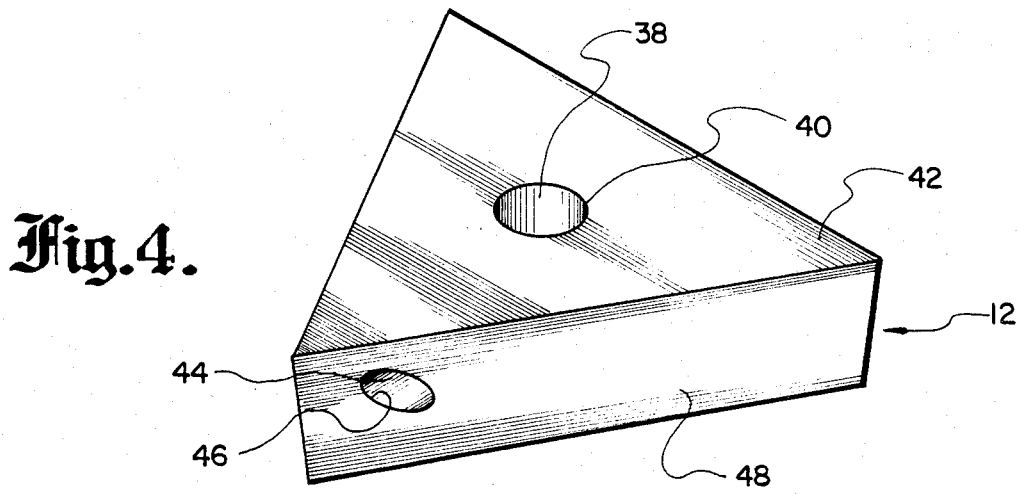
FIG. 4 is a perspective view of a seat for the cutting insert.

A seat 12 for use with the above-described internally cooled metal-working tool 10 is depicted in FIG. 4. Seat 12 may be a substantially triangular planar structure of either electrically conducting or nonconducting material. Seat 12 comprises a primary fluid passage 38 extending from a fluid intake port in the lower surface (not visible) of seat 12 to fluid outlet port 40 in upper surface 42 thereof. Primary fluid passage 38 also communicates with secondary fluid passage 44 which supplies coolant fluid to fluid exit port 46 located in the flank 48 of seat 12.

Figure 5:
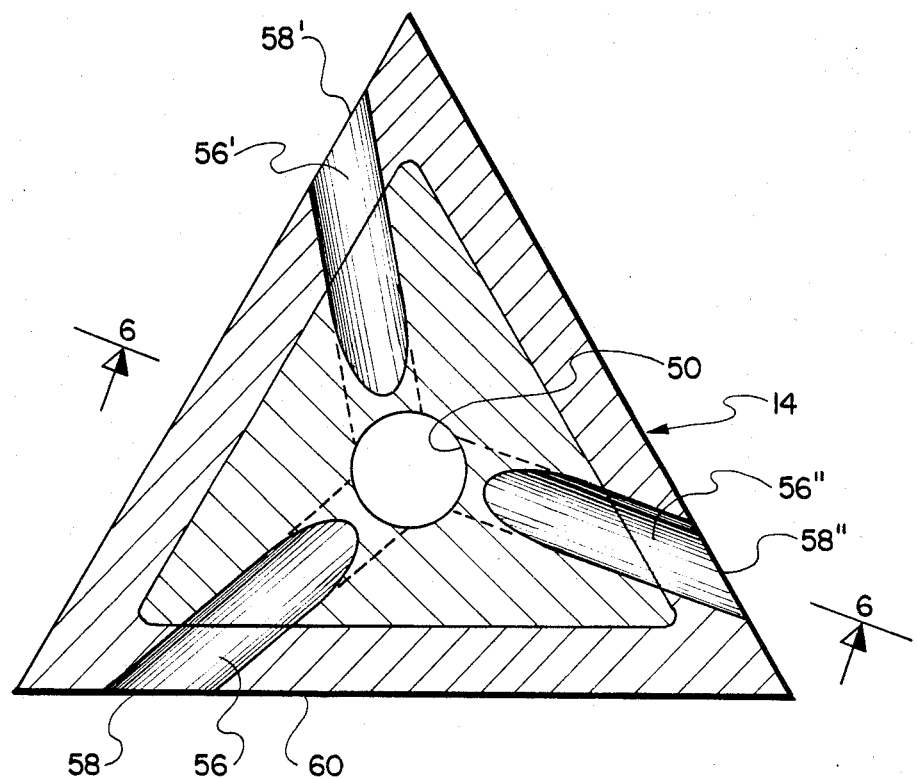
FIG. 5 is a horizontal cross-section of the cutting insert of FIG. 2.
Figure 6:
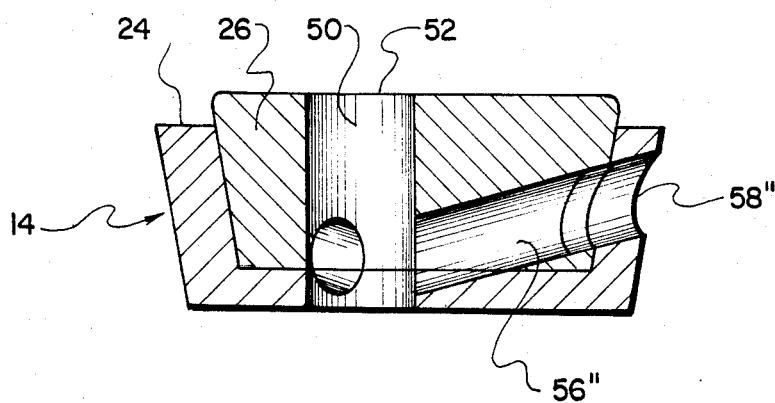
FIG. 6 is a cross-section of FIG. 5 taken along the line 6—6.

Cutting insert 14, depicted isometrically in FIG. 2, in horizontal cross-section in FIG. 5, and vertical cross-section in FIG. 6 has a primary fluid passage 50 extending from a fluid intake port located in the lower surface thereof (not visible) to fluid outlet port 52 located in the upper surface 34 of inner structural component 26. The fluid intake port is generally disposed to receive coolant fluid from fluid outlet port 40 in the seat 12. Primary fluid passage 50 communicates with a secondary fluid passage 56 which, as depicted in FIG. 5, supplies coolant fluid to fluid exit port 58 located in a vertical side 60 of cutting insert 14. Similarly, fluid may be selectively supplied to fluid exit ports 58' and 58" on the other flanks of cutting insert 14 by secondary fluid passages 56' and 56". However, only one secondary passage/fluid exit port combination is used at any given time, determined by the cutting region in use. The outlet ports 58,58' and 58" are proximate the cutting edges 28,28' and 28" and the metal-working regions 30,30' and 30", respectively. It should be mentioned at this point that the cutting insert 14 may be rotated manually when it is desired to change the cutting edge.

Figure 7:
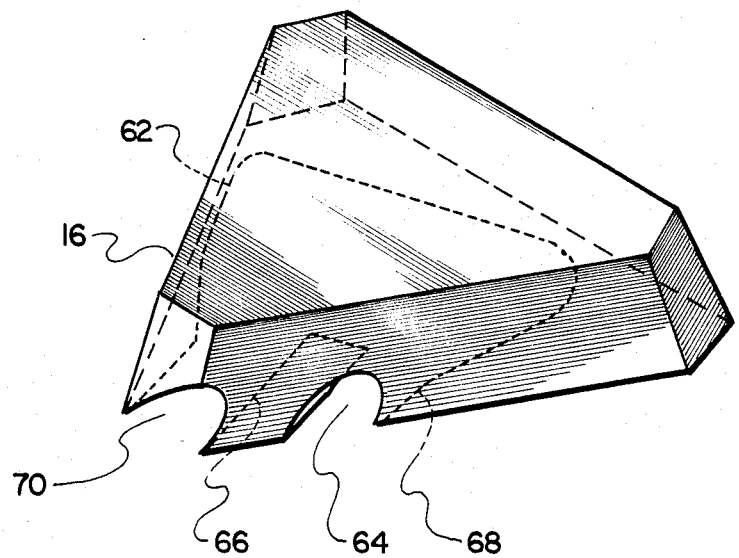
FIG. 7 is a perspective view of a metal-working tool chipbreaker.

As depicted in FIG. 7, chipbreaker 16 is a substantially triangular planar structure, preferably of conducting material, having a chamber 62 centrally disposed therewithin to receive fluid from fluid outlet port 52 in the insert 14. Chamber 62 is a depression extending partially through chipbreaker 16 and may be of any convenient geometry. Secondary fluid passages 64,66 communicate with chamber 62 and provide fluid to fluid exit ports 68,70, respectively.

Figure 8:
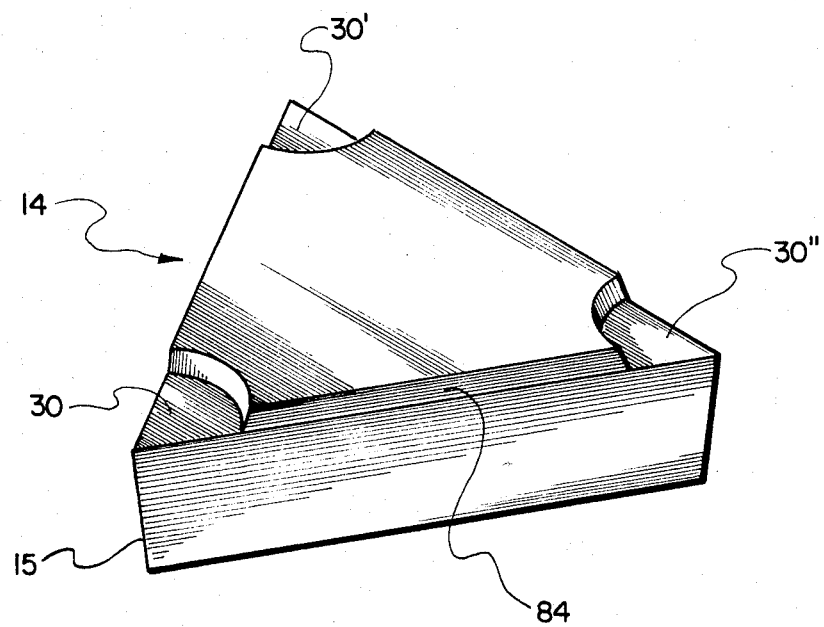
FIG. 8 is a perspective view of another type of cutting insert.

FIG. 8 is an illustration of another type of cutting insert. Here, the frame and core are formed as a single unit, shown as cutting insert member 15. A coating 84 is laid down on the top surface of the cutting insert member 15 with cut-away portions at each corner to expose the cutting edges 30,30' and 30". The coating 84 is formed from a good electrical conductor such as copper and is of such height as to provide good electrical contact with the chip 82 from the workpiece 72.

Figure 3:
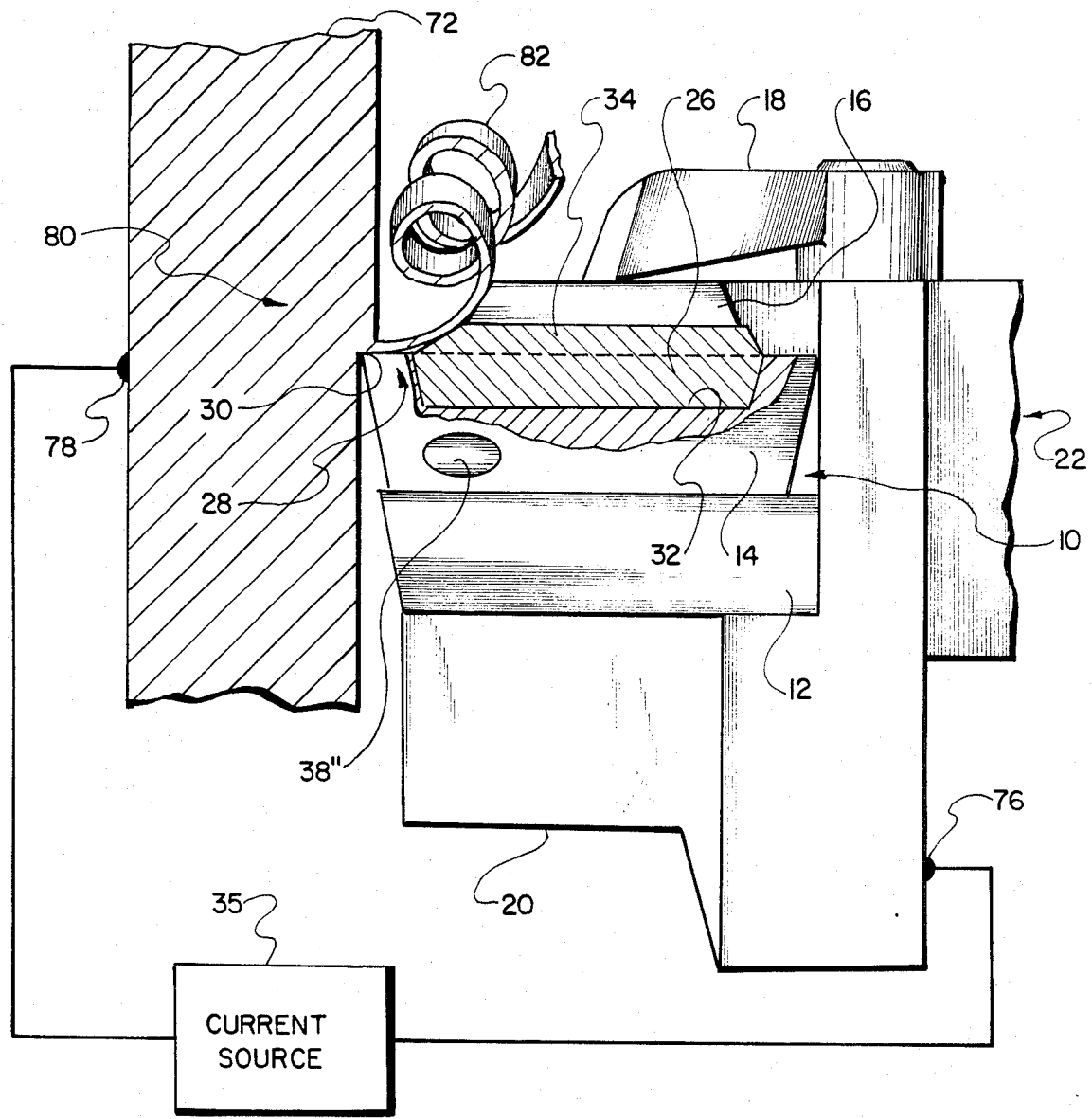
FIG. 3 is a schematic front elevation, partially broken away, of the metal-working tool of FIG. 1 depicting the electrical connections thereto.

FIG. 3 depicts a through-the-tool electrical hot metal-working tool in accordance with the preferred embodiment of the invention. (Note that the position of the workpiece 72 in FIG. 3 is not shown in its correct position relative to the cutting insert 14 but is shown so that the functions of the extension 34 and the chipbreaker 16 relative to the chip 82 are clear. The true position of the workpiece 72 would be at the left side but in front of the cutting tool, relative to the plane of the drawing.) Current source 35, capable of supplying high AC or DC current (on the order of 1000 A at approximately 1 volt) through first and second electrodes 76,78, is connected to tool 10 (through clamping means 22 in the preferred embodiment) and to metallic workpiece 72, respectively. Thus, with metal working edge 30 of cutting insert 14 in physical contact with a workpiece 72, a current loop exists from first electrode 76 through cutting insert 14, to shear zone 80 of workpiece 72 to second electrode 78. It should be noted that the polarity of electrodes 76,78 and thus the direction of current flow around the loop would have little, if any, effect on the operation of the device.

At the beginning of the metal working operation, current flow is established between metal working edge 30 and shear zone 80. As the metal working progresses, chip 82 develops and is brought into contact with the raised upper extension, or projection, 34 of inner structural component 26 as depicted in FIG. 3. Consequently, a second path for current flow is established from inner core 26 through chip 82 to shear zone 80. Thus, for a given amount of current flowing from current source 35 through shear zone 80, most of such current will flow via chip 82, decreasing the amount of current flowing through metal working edge 30. Since the amount of current flowing through metal working edge 30 is decreased, the amount of heat produced therein will decrease, reducing the rate of deterioration of metal working edge 30. On the other hand, if desired more current flow and thus more heating of the shear zone 80 may be achieved. Current is brought to the chip 82 mainly through the low-resistance core 26 but also through the chipbreaker 16 which is also in contact with the chip 82.

During metal working operations, the most intense heat is generated in the metal working region generally denoted 28, as depicted in FIG. 3, around the interface of metal working edge 30 and a workpiece 72. To help dissipate this heat the present invention may provide the aforesaid fluid passages and fluid exit ports to project coolant fluid streams proximate metal working region 28. Specifically, pressurized coolant flows from a coolant source (not shown) through the primary and secondary fluid passages as described hereinabove. Fluid projected from fluid exit ports 46,58,68 and 70 is directed proximate metal working region 28. It should be noted that secondary fluid passage 56 in cutting insert 14 passes beneath upper surface 36 of cutting insert 14 in the vicinity of metal working region 28, the region of highest tool temperature during metal working operations. Fluid flowing through secondary fluid passage 56 acts as a heat exchanger to conduct heat from metal working region 28.

It should be recognized that other embodiments of the present invention could comprise a tool having only a cutting member, or insert, 14, without a seat member 12, chipbreaking member 16, or coolant fluid system incorporated therein. The cutting member 14 thereof should have a raised portion on the upper surface thereof to form a chip-contact member which will function to break the chip 82.

It is also possible that, with some types of cutting tool in which the chip slides out laterally and flatly from the workpiece without curling upwards, the low-conductivity core can be formed with its surface coplanar with the surface of the frame, since such a chip would make contact with such a core surface.

Other embodiments might have other than triangular shapes for cutting insert 14, seat 12 and chipbreaker 16; e.g., these members could have a diamond shape.

In a further embodiment, a cutting member 14 could be employed which has no projection, or extension, above its top surface, i.e., the top surface is flat. In this embodiment, the chipbreaker 16 is the main conduit of electric current to the chip 82, although some current enters the chip 82 from the top surface of the cutting member 14. The cutting member 14 preferably still has a core 26 of more highly-conductive material (e.g., copper) than the material (e.g., carbide steel) of the frame 24. The core 26 conducts heat away from the cutting edge 30 and also considerably lowers the electrical resistance of the cutting member 14 so that, for the same amount of current, the heating of the cutting edge 14 is reduced.

Thus, the novel metal-working tool described herein may utilize the combination of fluid cooling and electrical hot metal working in order to more easily machine such high-strength materials as titanium and inconel. The high rate of tool wear ordinarily associated with such metal-working operations may be significantly reduced without a loss of metal-working efficiency.

From the foregoing, it should now be apparent that a novel metal working tool has been disclosed which possesses the capability of machining high strength materials more efficiently than prior art tools. It should be understood that although reference herein has been made to a preferred embodiment, the teachings of the invention are equally applicable to various other embodiments.

Although particular embodiments of the invention have been described and illustrated herein, it is recognized that other modifications and variations may readily occur to those skilled in the art, and consequently it is intended that the claims be interpreted to cover such modifications and equivalents.

What is claimed and desired to be secured by Letters Patent of the United States is:

1. A metal-working tool held in a metal clamp means, for machining a workpiece so that a chip is sheared from the shear zone thereof, comprising:

a high-strength electrically conductive frame having at least one upper surface having a metal-working region which has a cutting edge thereon;

a core, integral with and within said frame, having an upper extension projecting above said upper surface of said frame, said core being spaced from the workpiece by said frame, said core being formed from an electrically conductive material and said frame and core being formed with an internal fluid passage means having an exit port, said passage and port being located proximate said cutting edge; and means for connecting said tool to one terminal of a source of electical current and said workpiece to the other terminal of said source, whereby, when the tool is shearing a chip from said workpiece and wherein the chip has not been broken at the shear zone, the chip comes in contact with the core extension, so that electric current can flow, not only through the frame and cutting edge to the shear zone of the workpiece, but especially through the core and chip to the shear zone.

2. A tool as in claim 1, wherein:
the material forming the core is a better electrical conductor than the material forming the frame.

3. A tool as in claim 1, wherein:
said frame is triangular in form.

4. A tool as in claim 1, wherein:
said frame is triangular in form and has three cutting edges, one along each side.

5. A tool as in claim 4, wherein:
said frame and core are formed with an internal fluid passage means having three passages, each having an exit port located, respectively, proximate a different one of said three cutting edges.

6. A tool as in claim 1, further including:
a seat member supporting said frame and core and a chipbreaker member supported upon said core extension.

7. A tool as in claim 6, wherein:
said seat and chipbreaker members are formed with internal fluid passage means which couple with the internal fluid passage means of said frame and core.

8. A tool as in claim 1, wherein:
said core and frame are formed as a single unit having an upper surface and said upper extension comprises an electrically conductive coating on top of the upper surface of said single unit.

* * * * *